(12) United States Patent
Garcia

(10) Patent No.: US 6,737,131 B1
(45) Date of Patent: May 18, 2004

(54) NON-FLAMMABLE HAZARDOUS FLUID TANKS

(75) Inventor: Rod A. Garcia, Montgomery, TX (US)

(73) Assignee: Cerowa, Inc., Conroe, TX (US)

( * ) Notice: Subject to any disclaimer, the term of this patent is extended or adjusted under 35 U.S.C. 154(b) by 199 days.

(21) Appl. No.: 09/439,973

(22) Filed: Nov. 12, 1999

(51) Int. Cl.[7] .............................. B29D 22/00; B32B 1/08
(52) U.S. Cl. ................ 428/35.7; 428/36.91; 428/320.2; 428/500; 220/4.12; 220/4.13; 220/4.14; 220/586; 206/6; 280/830
(58) Field of Search ........................... 428/35, 7, 36.91, 428/320.2, 476.1, 475.8, 516, 520, 36.9; 220/4.12, 4.13, 4.14, 586; 206/0.6; 280/830

(56) References Cited

U.S. PATENT DOCUMENTS

| | | | | |
|---|---|---|---|---|
| 4,740,527 A | * | 4/1988 | Von Bonin | 521/105 |
| 5,020,687 A | * | 6/1991 | Seizert | 220/645 |
| 5,384,172 A | * | 1/1995 | Takado et al. | 428/35.7 |
| 5,441,781 A | | 8/1995 | Uchida et al. | 428/35.7 |
| 5,496,069 A | | 3/1996 | Milligan | 280/830 |
| 5,612,101 A | | 3/1997 | Furuta et al. | 428/1 |
| 5,645,926 A | * | 7/1997 | Horrocks et al. | 442/234 |
| 5,939,158 A | | 8/1999 | Plotzker | 428/35.7 |
| RE37,144 E | * | 4/2001 | Webb | 219/73 |

* cited by examiner

*Primary Examiner*—Sandra M. Nolan
*Assistant Examiner*—Michael C. Miggins
(74) *Attorney, Agent, or Firm*—Kurt S. Myers

(57) ABSTRACT

The present invention is directed to a fluid tank for carrying hazardous materials such as a automobile gasoline tank which is non flammable and flame resistant. More specifically, the present invention is directed to a fluid tank having an outer layer of a polyolefin containing a non halogen char forming additive to prevent flammability.

15 Claims, 1 Drawing Sheet

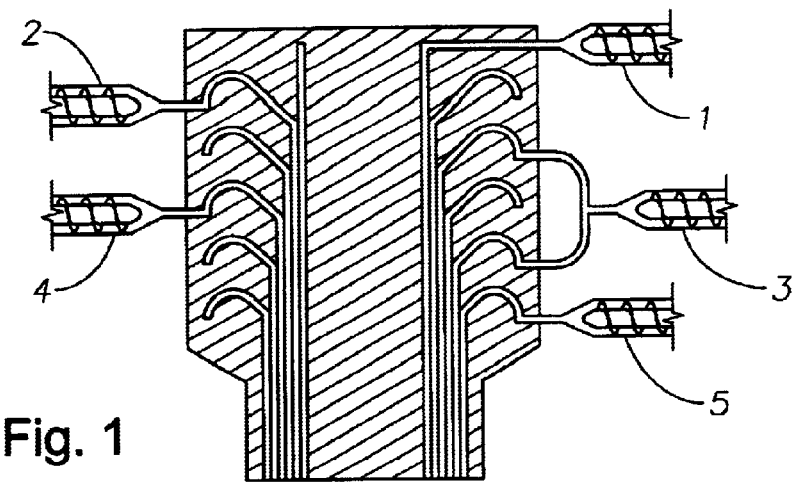
Fig. 1
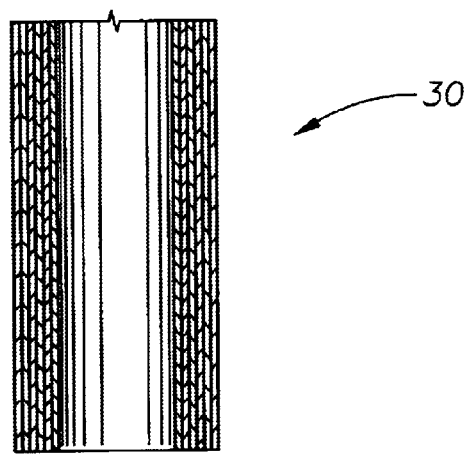
Fig. 2
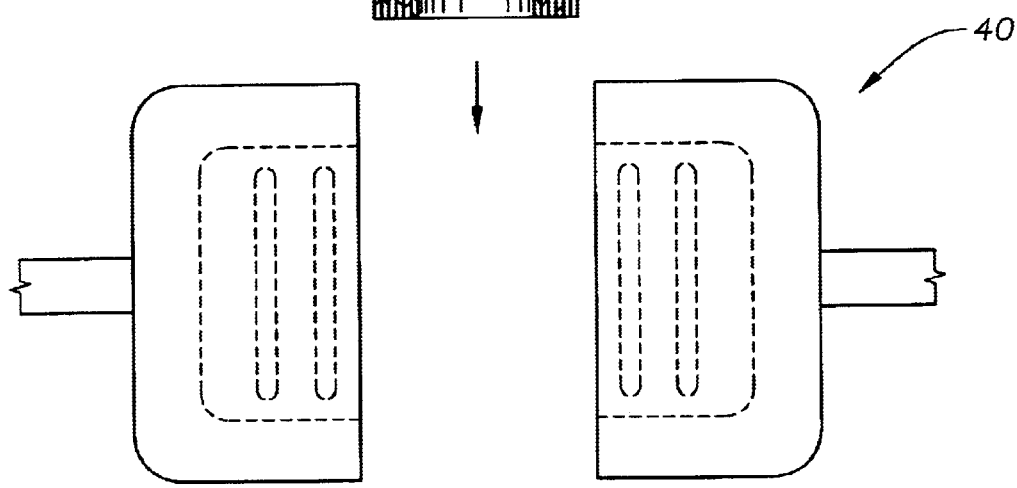

NON-FLAMMABLE HAZARDOUS FLUID TANKS

FIELD OF THE INVENTION

The present invention is directed to a non-flammable fluid tank, such as an automobile gasoline tank.

BACKGROUND OF THE INVENTION

The industry has used metal gasoline tanks on automobiles for years. When using metal tanks, a metal tank is susceptible to bursting upon impact. In addition, once the tank is burst or penetrated, the exposure to gasoline spillage is cause for fire and/or explosion. Plastic tanks have been used in recent years but there has been a concern regarding plastic tanks in the event of fire to cause melting and exposure to the gasoline in the tank. The present invention is directed to a plastic tank which is not only non flammable but resistant to exposure of flames at high temperatures.

The protection of gasoline tanks by using a metal shield is disclosed in U.S. Pat. No. 5,496,069. The present invention in contrast provides the protection to fire as part of the fuel tank composition.

The manufacture of fuel tanks by blow molding plastics is shown in the following patents:

U.S. Pat No. 5,384,172 discloses a multi-layer plastic fuel tank. The multi-layer structure comprises an outer and inner high-density polyethylene layer, a central polyamide layer and an intermediate modified high-density polyethylene layer which bonds the adjacent high-density polyethylene layer to the central polyamide layer.

U.S. Pat. No. 5,441,781 discloses a multi-layer plastic fuel-tank. The multi-layer plastic tank comprises a gas barrier layer (a modified polyamide), an adhesive layer (a modified poyethylene and a high-density polyethylene layer.

U.S. Pat. No. 5,612,101 discloses a hollow molded article container and method for producing the same. The article container is a laminated structure comprising a layer of liquid crystal polyester resin and a layer of a thermoplastic resin, such as high-density polyethylene.

U.S. Pat. No. 5,939,158 discloses laminar articles of polyolefin and nylon/polyvinyl alcohol blends.

In each of the foregoing patents are multi-layer articles which may include an automobile gasoline tank and the method for producing such articles. However, no patent discloses the use of an additive package in the outer layer polyethylene which produces a flame resistant and non flammable tank.

SUMMARY OF THE INVENTION

The present invention is directed to a fluid tank for carrying hazardous materials such as a automobile gasoline tank which is non flammable and flame resistant. More specifically, the present invention is directed to a fluid tank having an outer layer of a polyolefin containing a non halogen char forming additive to prevent flammability.

BRIEF DESCRIPTION OF THE DRAWINGS

FIG. 1 is a schematic cross-section of a die for producing a multi-layer parison for introduction to a blow molding apparatus; and FIG. 2 is a cross-sectional parison which is entering a blow molding mold.

DETAILED DESCRIPTION OF THE INVENTION

The foregoing patents directed to blow molding of multi-layer articles are representative of the art that has been developed to manufacture plastic gas-tanks or automobile tanks for gasoline. However, in each patent the emphasis is directed to the characteristics of the various layers to provide a structure that is impermeable to gas and liquid and provide the requsite physical properties of a gas tank. The common thread in these patents is that a polyolefin such as high-density polyethylene provides the physical properties desired but is permeable to gases, meaning gases can pass though the molded polyethylene layer. A plastic layer that is most satisfactory as a gas barrier to the fluid in the tank because of the chemical inertness of the polyethylene layer cannot be directly bonded or laminated to the plastic barrier layer. Therefore, it is necessary to provide an adhesive layer of plastic, one having chemical characteristics that will adhere to the polyethylene and the barrier plastic, to produce a tank having the desired physical properties and the necessary gas barrier to the fluid in the tank. Depending on the specific plastic used in the gas barrier layer, the composition of the adhesive layer will vary. However, none of these patents address the flame resistance or the non flammability of the tank. The present invention is directed solely to solving this problem of the prior art; namely, providing a flame resistant and non-flammable tank.

The present invention is directed to the addition of non-halogen intumescent additives to the outer layer of polyolefin to prevent flammability of the tank for holding hazardous fluids such as gasoline. "Intumescence" is defined as a process of char formation that occurs by the reaction of the intumescent additives in the plastic when subjected to flame or high heat. The additives react to produce an insulation barrier of carbon that eliminates combustion. The char formation occurs in the solid phase with some swelling and foaming and creates a crust or barrier to prevent further combustion.

The intumescent additive packages are mostly proprietary and it is uncertain what the chemical compositions are in the packages. However, the preferred non halogen intumescent additives are well known by their trade names, such as, "Exolit MR", a product of Hoechst Chemical Company (a phosphate compound); "Char guard 32911 or "NH-1511" products of Great Lakes Chemical Company (phosphate compounds); "Spin Flam" a product of Monsanto Chemical Company (a phosphate compound); "Amgard EDAP", a product of Albright & Wilson (an ethylene diamine phosphate); "Budit 311", a product Budauheim a melamine—pyro-phosphate): "NCENDX P-30", a product of corporation and "FRX44", a product of Unitex Corp (an ethylene diamine phosphate). Each of these intumescent additive contains phosphorus and nitrogen compounds; however, other intumescent compounds axe available and are being developed that are considered suitable for use in the present invention.

Common to each of the above intumescent additive packages or non-halogen flame resistant (NHFR) packages are the presence of the following types of compounds and the weight percent:

| Type | Weight percent |
| --- | --- |
| Phosphorus containing compounds | 10–35 |
| Nitrogen containing compounds | 10–35 |
| Char forming (high carbon) compounds | 5–15 |
| Bubbling agent | 5–25 |
| Dispersing agent | 0.5–2 |

The function of each of these compositions is not fully understood in the intumenscent additive package or is it the purpose of this patent to explain the function, only to make clear the presence of each group of compositions. As obtained from the specification sheets indicating the active ingredients of the proprietary additive packages, the active ingredient(s) is both a phosphorus containing and nitrogen containing compounds such as ethylene diamine phosphate, melamine—pyro-phosphate and ammonia polyphosphates. However, phosphates or polyphosphates may be used as one compound together with a nitogen compound such as melamine. The char forming compounds may be compounds such as pentaerythritol added to the additive package or may be the polyolefin itself, polyethylene or polypropylene. Pentaerythritol may also be considered a bubbling agent, used here to mean a compound that causes a bubbling effect. Melamine is another bubbling agent. These compounds may react to form some gas in the solid but not a gas necessarily released to the atmosphere. The apparent function is to allow migration of the char forming compounds to the outer surface where the flame is contacting the surface of the tank. The dispersing agents are compounds that prevent the bleading of the phosphorus compounds from the molded tank. Suitable dispersing agents are stearic acid or the silanes. The combination of these compounds are considered as the non-halogen flame retardant (NHER) additive package of the present invention.

The NHFR additive package may be added by the molder to the polyolefin outer layer. When added by the molder the NHFR additive package may be added to the molding extruders as: 1) a pellet (100% active compound); 2) a powder (100% active compound); or 3) a super additive concentrate (80–90 wt %). If added as a concentrate or masterbatch, the intumescent additive is added to a compatible resin, i.e. compatible to the polyolefin resin used in the fuel tank, that will enhance the physical properties of that fuel tank resin. Such masterbatch additive packages will contain the following typical formulation:

| Master batch additive Package | percent by weight |
|---|---|
| Base resin | 80.0–17.0 wt % |
| NHFR package | 20.0–80.0 wt % |
| Carbon Black | 0–3.0 wt % |

The most efficient system to use to prepare a concentrate or masterbatch is a twin screw extruder. The concentrate is added to the outer layer polyolefin as a predispersed pellet. The preferred method for the molder is to add to a down stream feeding port in the outer layer extruder either the pelletized or the powder NHFR additive package. These pellets or the powder are introduced into the polyethylene extruder used in the outer layer of the tank of the present invention to obtain amounts of NHFR additive in outer layer within the range of about 10 wt % to 50 wt %. A preferred amount is between 25 wt % and 40 wt %.

The fuel tanks of the present invention may be blow molded, the preferred method, or be rotational molded. However formed, the fuel-tanks of the present invention have an outer layer of a polyolefin, preferably polyethylene, which has an additive package containing a non halogen intumescent additive to prevent flammability. Further, that outer layer will have a thickness of at least $\frac{1}{32}$" and will range from preferably $\frac{1}{8}$" to $\frac{1}{4}$".

Referring now to FIG. 1, a blow molding die 10 is illustrated for producing a six (6) layer parison. Extruder 1 is fed a virgin polyethylene resin that becomes the inside. layer of the fuel tank of the present invention. Extruder 2 is fed a regrind resin that is optionally used to reduce the cost of the tank, this layer providing physical properties at reduced cost. Extruder 3 is fed a tie or adhesive layer of plastic material, the specific resin is dependant on the composition of the barrier layer resin fed to Extruder 4. Extruder 5 is also fed a tie layer plastic material. Extruder 6 is fed a polyolefin, preferably polyethylene, that contains the non-halogen intumescent additive package or to which the additive package containing a non halogen intumescent additive is added to prevent flammability. The present invention is an improvement to the current technology of blow molding gas tanks for automobiles and therefore, the specific composition of the barrier layer and the composition of the resins used as tie resins is not part of this invention. What the patents illustrated above to produce gas tanks all emphasize is the nature of the barrier layer and the overcoming of the problem of bonding securely the polyolefin layer in a product such as a gas tank with the barrier layer resin. What all these patents fail to illustrate is a flame retardant gas tank.

Referring now to FIG. 2, a six (6) layer parison 30 is illustrated as being introduced to a blow molding die 40. The blow molding process is well known and the detail of the specifics of a die 40 is not part of this invention. The illustrations are used only to emphasize the nature of the present invention which requires that the outer layer of the molded tank contains a non-halogen intumescent additive to prevent flammability.

The significance of the presence of the non-halogen intumescent additive is illustrated by the following example.

EXAMPLE 1

A) A solid polyethylene test bar film having a thickness of $\frac{1}{16}$"×$\frac{1}{4}$"×5" is made in conventional injection molding apparatus, the polyethylene resin has the usual stabilizers present in commercial resins.

B) A second polyethylene test bar film having a thickness of $\frac{1}{16}$"×$\frac{1}{4}$"×5" is made in conventional injection molding apparatus, this polyethylene resin has the usual stabilizers present in commercial resins but in addition a 35 wt % NHFR additive package is included.

| ASTM Test Method - UL94 | result |
|---|---|
| Bar A | V2 |
| Bar B | V0 |

This ASTM method shows that there is no melting of the polyethylene of Bar B even though the vertically held test bar exposes only $\frac{1}{16}$" to the flame.

A more stringent test was made on a 4 ¼" disk having a ⅛" thickness and containing an approximately 38 wt % loading of NHFR additive. Using an acetylene torch having a flame with a temperature of approximately 3000° F., the flame is held to the disk. The flame is maintained on the disk for approximately one (1) minute. The disk turned red and then immediately turns black. There is black crust or char that forms on the surface of the disk in the area of the flame; however, the flame seems deflected from the surface and there is no ignition of the disk. The surface is very hot, but the bare hand can touch the back side of the disk without being burned about 30 seconds to one minute after the flame is removed from the front side of the disk.

The present invention for producing a tank suitable for an automobile gas tank is illustrated in the following examples:

EXAMPLE 2

Using the illustration of FIG. 1, reference is made to U.S. Pat. No. 5,384,172 and U.S. Pat. No. 5,441,781, which are incorporated herein by reference, for specific materials and compositions for making a multiple layer plastic fuel tank where the barrier materials are polyamides. Specific examples of polyamides include nylon 6, nylon 66, nylon 610, nylon 9, nylon 12, nylon 6/66, nylon 66/610, and nylon 6/11. Any of these materials may be employed in the extruder 4 of FIG. 1 as the barrier material. Virgin polyethylene is introduced to extruder 1 of FIG. 1. Introduced to the extruder 3 are the tie or adhesive materials as illustrated by the modified polyethylene resins specifically illustrated in the above two patents. As stated in the patents, blow molding by its nature produces substantial scrap. This scrap material is reground and fed to extruder 2 in FIG. 1. The step which illustrates the present invention is that the high density polyethylene introduced to extruder 5 in FIG. 1, contains a NHFR additive package of between 10 and 50 wt %. Further, this outer layer of polyethylene has a thickness of at least 1/32".

EXAMPLE 3

Example 2 is duplicated except that the NHFR additive package in the outer layer of high density polyethylene is between 30 wt % and 40 wt % and the outer layer is at least 1/8".

EXAMPLE 4

Example 2 is duplicted except the barrier layer is a ethylene vinylalcohol (EVOH) resin. The EVOH resin is introduced into extruder 4 of FIG. 1. U.S. Pat. No. 5,939,158, which is incorporated herein by reference, illustrates the tie or adhesive layer resins available for an EVOH resin.

Other barrier material resins may be used to produce the multi-layer plastic fuel tanks such as polyvinylidene dichloride resins; however, the present invention is not directed to any specific combination of resins for the properties of the fuel tank except the use of the NHFR additive package in the outer layer of polyolefin. In all the examples polypropylene may be used instead of the high density polyethylene.

In the examples, the NHFR additive package may be essentially composed of a single proprietary intumescent additive package, a mixture of proprietary intumescent additive packages or a package that uses a proprietary intumescent additive package that is implemented by available material such as ammonium phosphates, melamine, pentaerythritol and the like. It is preferred that the dispersing agents are present in greater amounts than in available commercial packages to prevent the phosphorus compounds dispersing to the surface. It is also contemplated that a molder may use a non-proprietary mixture of the compounds making the NHFR additive package and incorporate that package into the outer polyolefin layer. Still further, a major manufacturer of polyolefins may incorporate the NHFR additive package during the production of the polyethylene or polypropylene to sell a resin for the direct application as the outer layer of a plastic fuel tank. The manufacturer may produce such resins for blow molding or rotational molding or any other method used.

What is claimed is:

1. A non-flammable tank comprising:

a multi-layer molded structure having an outer layer of a polyolefin, said outer layer containing a non-halogen intumescent additive package to prevent flammability.

2. A non-flammable tank according to claim 1 wherein said intumescent additive package is present in an amount between 10 and 50 weight percent of said outer layer polyolefin.

3. A non-flammable tank according to claim 2 wherein said outer layer of polyolefin is at least 1/32" thick.

4. A non-flammable tank according to claim 3 wherein said tank is an automobile gasoline tank.

5. A molded tank according to claim 4 wherein said outer layer is polyethylene.

6. A molded tank according to claim 5 wherein said tank is an automobile gasoline tank.

7. A molded tank according to claim 4 werein said outer layer is at least 1/8" thick.

8. A non-flammable tank according to claim 2 wherein said intumescent additive package includes a phosphorus containing additive.

9. A multi-layer blow molded tank for hazardous fluids comprising:

an outer layer of said tank, said outer layer comprising a polyolefin containing a non-halogen intumescent additive to prevent flammability.

10. A molded tank according to claim 9 wherein said non-halogen intumescent additive package includes a phosphorus containing additive.

11. A multi-layer, blow molded tank for hazardous fluids having an inner layer of a polyolefin, an intermediate layer of a plastic providing a gas barrier to said hazardous fluid and an outer layer of a polyolefin, the improvement comprising:

said outer layer containing a non halogen intumescent additive to prevent flammability.

12. A multi-layer tank according to claim 11 wherein said tank is an automobile gasoline tank.

13. A multi-layer tank according to claim 12 wherein said outer layer is polyethylene.

14. A multi-layer tank according to claim 13 wherein said outer layer is at least 1/8" thick.

15. A multi-layer tank according to claim 13 wherein said outer layer is between 1/8" and 1/4" thick.

* * * * *

UNITED STATES PATENT AND TRADEMARK OFFICE
CERTIFICATE OF CORRECTION

PATENT NO.         : 6,737,131 B1
APPLICATION NO.    : 09/439973
DATED              : May 18, 2004
INVENTOR(S)        : Rod A. Garcia It is certified that error appears in the above-identified patent and that said Letters Patent is hereby corrected as shown below:

On the Title Pg, Item (73)
The Assignee name shown on the assignment recorded on 10/22/2003 on reel 014630, frame 0989, is incorrect. The correct name of the Assignee is "CEROWA, LP", not "CEROWA, INC."

Signed and Sealed this

Thirtieth Day of November, 2010

David J. Kappos
*Director of the United States Patent and Trademark Office*